(12) United States Patent
Weaver et al.

(10) Patent No.: US 10,785,381 B2
(45) Date of Patent: Sep. 22, 2020

(54) METHOD OF PROVIDING CODING INSTRUCTIONS TO A PRINTER

(71) Applicant: VIDEOJET TECHNOLOGIES INC., Wood Dale, IL (US)

(72) Inventors: Robert Weaver, Sandy Springs, GA (US); John Fini, Chicago, IL (US); Kristiaan Van Bael, Sint-Laureins (BE); Martin Beyer, Bergkamen (DE)

(73) Assignee: VIDEOJET TECHNOLOGIES INC., Wood Dale, IL (US)

( * ) Notice: Subject to any disclaimer, the term of this patent is extended or adjusted under 35 U.S.C. 154(b) by 0 days.

(21) Appl. No.: 15/559,510

(22) PCT Filed: Mar. 10, 2016

(86) PCT No.: PCT/US2016/021717
§ 371 (c)(1),
(2) Date: Sep. 19, 2017

(87) PCT Pub. No.: WO2016/149029
PCT Pub. Date: Sep. 22, 2016

(65) Prior Publication Data
US 2018/0124273 A1 May 3, 2018

(51) Int. Cl.
*H04N 1/32* (2006.01)
*G06Q 10/10* (2012.01)
*G06Q 10/08* (2012.01)
*G06F 3/12* (2006.01)
*G06F 7/14* (2006.01)
*G06K 7/14* (2006.01)

(52) U.S. Cl.
CPC ....... *H04N 1/32149* (2013.01); *G06F 3/1268* (2013.01); *G06F 3/1275* (2013.01); *G06F 3/1284* (2013.01); *G06Q 10/08* (2013.01); *G06Q 10/101* (2013.01); *G06K 7/1413* (2013.01)

(58) Field of Classification Search
CPC . H04N 1/32149; G06F 3/1284; G06F 3/1268; G06F 3/1275; G06Q 10/08; G06Q 10/101; G06K 7/1413
See application file for complete search history.

(56) References Cited

U.S. PATENT DOCUMENTS

2011/0116133 A1* 5/2011 Walker ............... G06T 11/00
358/1.18
2014/0367464 A1* 12/2014 Herzig ............... G06K 1/121
235/375

* cited by examiner

*Primary Examiner* — Christopher Wait
(74) *Attorney, Agent, or Firm* — Beusse, Wolter, Sanks & Maire PLLC; Robert L. Wolter (57) ABSTRACT

A method of providing coding instructions to a printer includes creating artwork design for a package and creating coding instructions associated with the artwork design, the coding instructions for printing a code on the package. The coding instructions are associated with the artwork design and transferred to a remote storage location. An identifier is provided with the package, package materials, or a component thereof to allow a user to retrieve the coding instructions for printing the code on the package.

22 Claims, 6 Drawing Sheets

METHOD OF PROVIDING CODING INSTRUCTIONS TO A PRINTER

BACKGROUND

The present disclosure relates to a method of providing coding instructions to a printer.

Computerized graphic design programs for composing and editing graphic designs and artwork for use in packaging are well known in the art. The created designs and artwork are typically stored as graphical data files that are ultimately sent to an output device for printing and/or display. In some commercial processes, the output process may include a preprint process followed by the process of printing itself. In addition to the artwork that is printed on the package, which is generally the same for a larger number of packages, there is also generally a variable code printed on the package that is unique to each package or to a smaller number of packages. This unique variable code may be, for example, a lot code, date code, best by date, or the like. The variable code is printed by a different type of printer and at a different location than the artwork. For example, the artwork may be printed on the packaging substrate by a converter (by a method such as offset printing), while the variable code is printer at the beginning or end of a filling line in the factory (by a printer such as a continuous inkjet printer or thermal transfer overprinter).

An existing problem is that these printed variable codes are added without approval of the artwork designers or brand owners. Many legal, practical, branding, and aesthetic considerations go into packaging design. Artwork creators are accustomed to taking these requirements into account, and brand owners have different experts on all these aspects reviewing and approving the artwork before it goes into production. For example, a potato chip bag has an expiration date printed on the package, but this printing is done at a later stage than the printing of the artwork on the film that that package is created from, with little of the oversight that is provided with the artwork printing. It would be beneficial to the brand owner to include the coding instructions into the aforementioned approval workflow. The artwork designer or brand owner often lacks control over this later printing process. This leads to a lack of consistency of printed codes across lines and plants. Further, the factories or plants where the variable codes are printed often find about changes in the packaging design late in the cycle. The printer setup is often left to the person in charge of the line in the plant, who may have little insight into the artwork creation plan and the like. This printer or line operator lacks insight in all the considerations that went into the design (such as legal, branding, and the like). More importantly, the printer or line operator doesn't know what was approved by the brand owner. The existing system requires significant manual effort to ensure that the right product has right code and the right setup.

BRIEF SUMMARY

The present disclosure provides a method of providing coding instructions to a printer. In particular, it provides a method and system to ensure that the instructions for the variable code are decided during the artwork creation process (such as by the brand owner or artwork designer), and have those coding instructions transmitted to the printer at the factory for printing on the final package. The coding decisions are made in advance rather than during the process of printing the variable code itself. The coding instructions are preferably visualized or otherwise simulated along with the artwork during the design and approval stage, so that they can be visually approved together.

In one aspect, a method of providing coding instructions to a printer includes creating and/or an artwork design for a package and providing coding instructions associated with the artwork design, the coding instructions for printing a code on the package. The coding instructions are associated with the artwork design and transferred to a remote storage location. An identifier is provided with the package, package materials, or a component thereof to allow a user to retrieve the coding instructions for printing the code on the package.

In another aspect, a system for providing coding instructions includes a computer system configured for creating an artwork design for a package, providing coding instructions associated with the artwork design, the coding instructions for printing a code on the package; and associating the coding instructions with the artwork design. A remote storage location is in electronic communication with the computer system and configured to receive the coding instructions from the computer system. An identifier is associated with the package, package materials, or a component thereof to allow a user to retrieve the coding instructions for printing the code on the package.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

It is well understood in the art that there are any number of ways to express the computerized instructions readable by a computer to generate the output corresponding a graphics file. This invention is not specific to any particular way of expressing the instructions, nor does this disclosure describe in detail how these instructions are formatted, stored or processed by output devices, all of which is well understood by those of skill in the art and well documented in the literature. Regardless of how the various graphical objects are expressed by the corresponding software for generating such objects or in the stored instructions used for instructing the software, it is well understood that each graphical object corresponds to instructions executable by a computer to produce a tangible result, whether that result constitutes a display, a printed page, a printing plate, a cut sheet of material, or any other type of output. Numerous systems already exist for interpreting these computerized instructions into formats used by editors to manipulate the graphical objects expressed by those instructions. This invention is not limited to any particular system for interpreting or editing such instructions. Rather, this invention relates to ways in which existing editors can be extended to provide coding instructions for printing the variable code printed on the packaging material including the artwork design.

Thus, the present disclosure provides a method of providing coding instructions to a printer. By printer is a meant a printing device for printing some sort of variable code. In particular, it provides a method and system to ensure that the brand owner or artwork design can specify instructions for the variable code during the artwork creation process, and have those coding instructions transmitted to the printer at the factory for printing on the final package.

Figure 1:
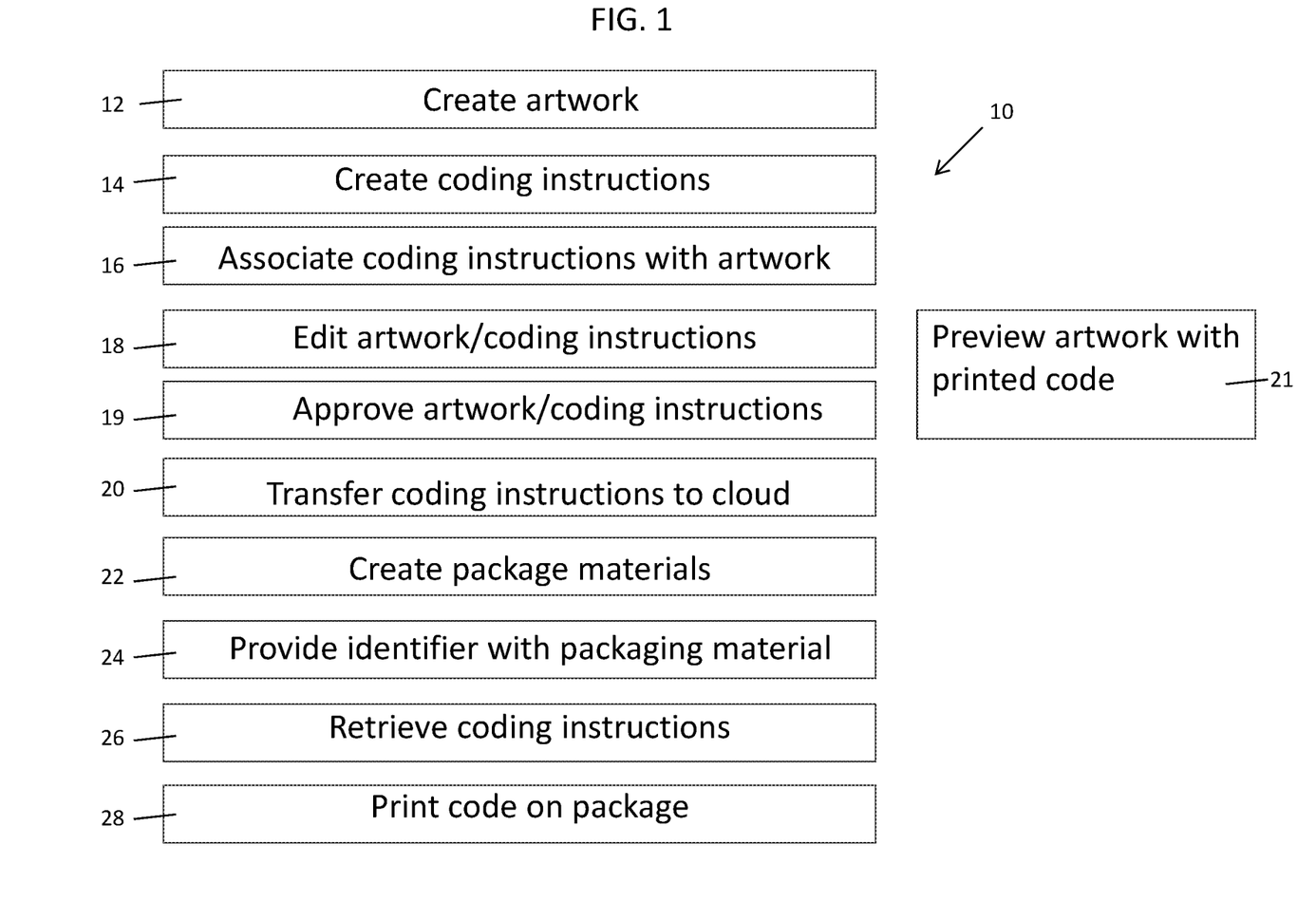
FIG. 1 is a typical work flowchart showing a method of providing coding instructions to a printer according to an embodiment of the disclosure.

The disclosure herein provides a method of providing coding instructions to a printer includes creating artwork design for a package. As used herein, "package" means a substrate that can be printed upon that is typically used to contain or decorate a product, or form part of a product, including such outer components as labels, shrink wraps, and the like. Examples include cardboard containers, plastic and foil bags, plastic boxes, and the like. FIG. 1 is a typical work flowchart showing a method 10 of providing coding instructions to a printer according to an embodiment of the disclosure. As a general overview, in a first step 12, artwork is created. Coding instructions are created at step 14 and associated with the artwork at step 16. Once created, the artwork and coding instructions may be further edited during the design process at step 18. An approval process 19 is provided, which may occur during or after steps 12, 14, 16, 18 of creating and editing the coding instructions and artwork. The approval step 19 may occur more than one time. The artwork and printed code may also be previewed during this process at step 21. The preview step 21 may occur during or after steps 12, 14, 16, 18, 19 of creating, editing, and approving the coding instructions and artwork. The preview step 21 may occur more than one time. After the coding instructions are finalized, they are transferred to a remote storage location, such as a cloud-based storage system, at step 20. Packaging materials depicting the artwork are created at step 22. The packaging materials are provided with an identifier that is associated with the coding instructions at step 24. The coding instructions are retrieved at step 26 and used to print a code on a package formed from the packaging materials at step 28.

Figure 3A:
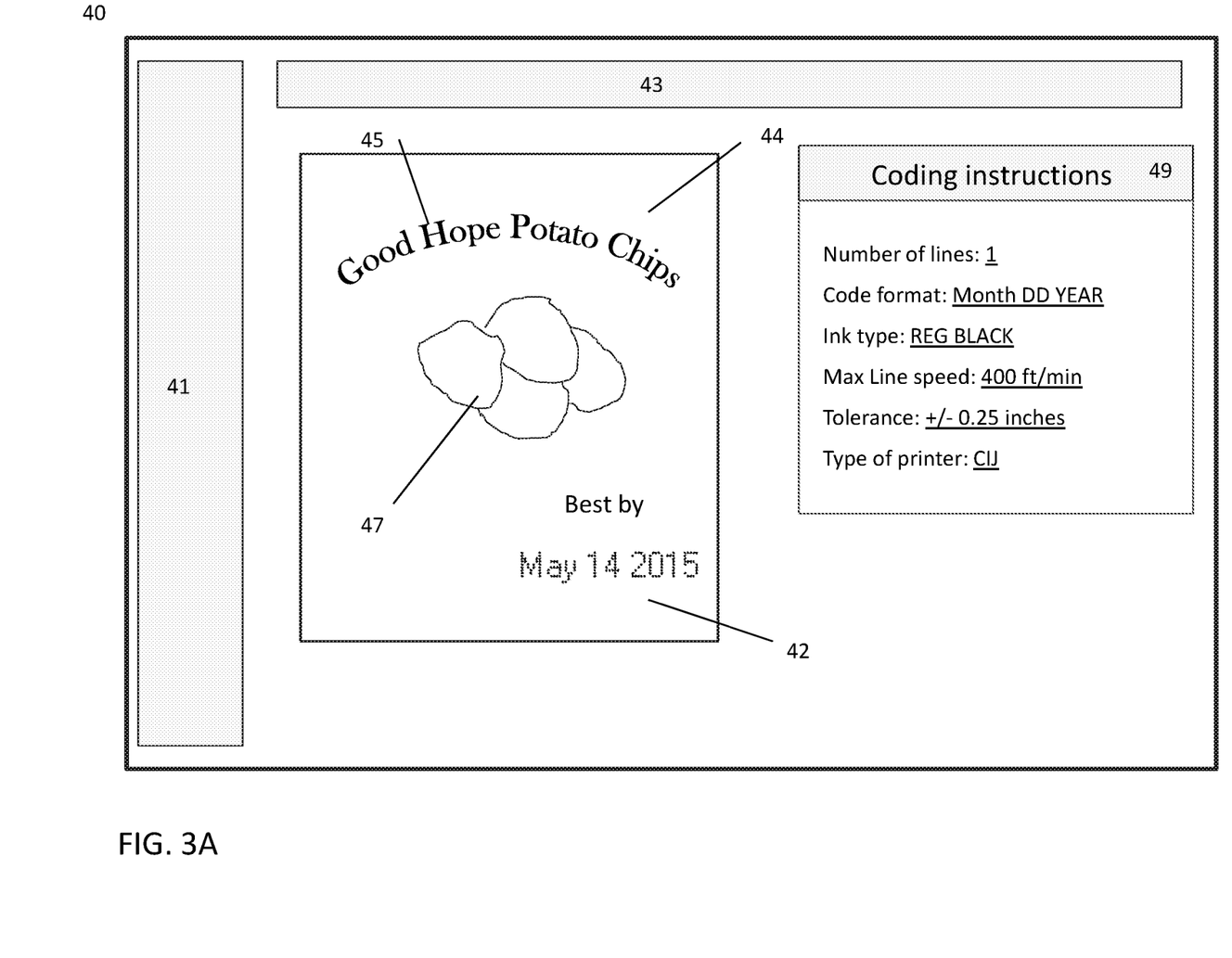
FIG. 3A is an embodiment of a display for creating coding instructions.
Figure 3B:
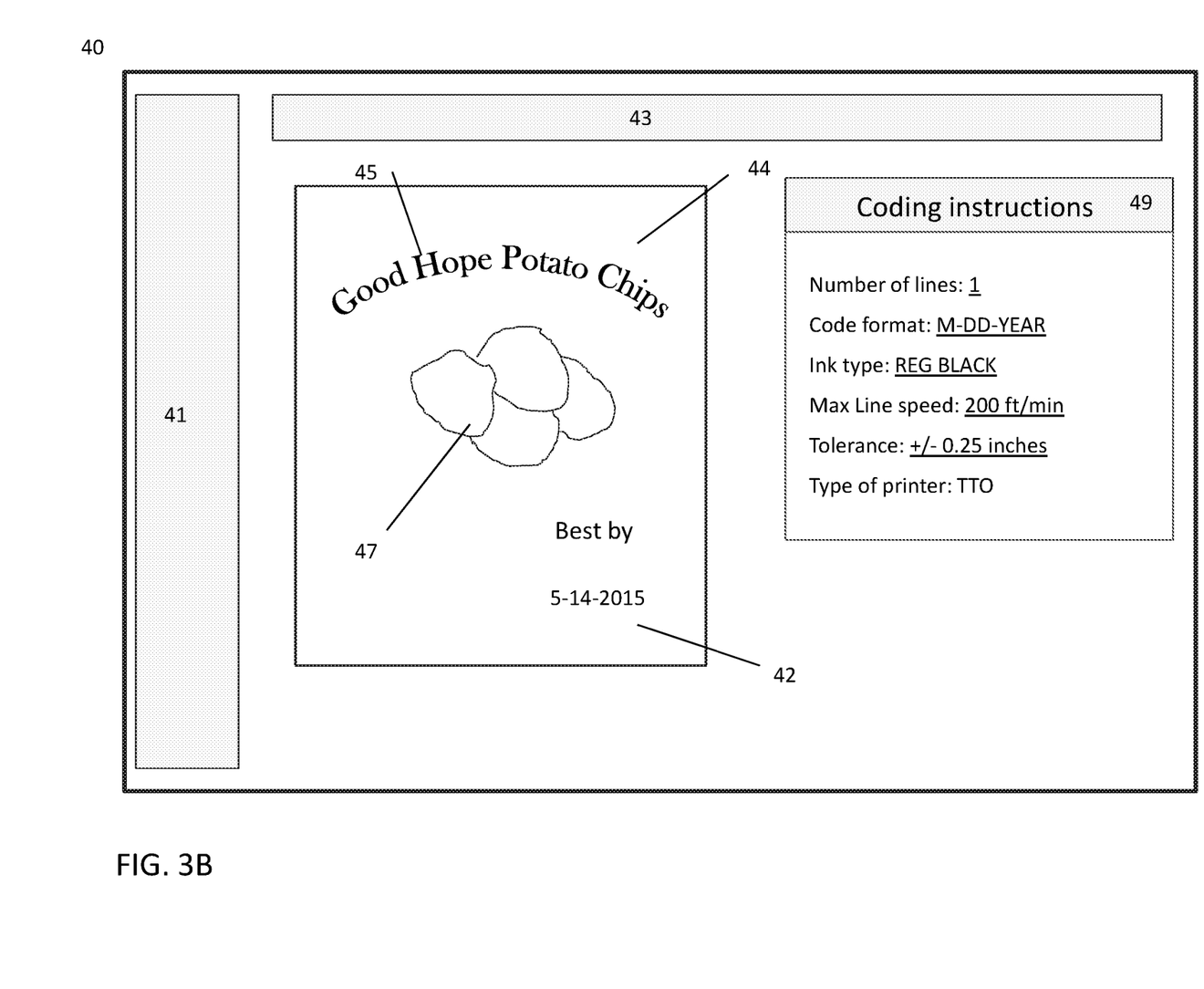
FIG. 3B is a second embodiment of a display for creating coding instructions.

Starting at the artwork creating step, existing programs for designing and/or editing artwork for packages are well known. The present disclosure allows the creation of coding instructions associated with the artwork design, the coding instructions being used for printing a code on the package. As shown in FIGS. 3A and 3B, the artwork design comprises graphical components and text components. An artwork layout produced, for example, for a single packaging instance may include a set of one or more graphic files, which may be hierarchically arranged on a computer-readable medium. Moreover, the layout typically includes a plurality of constituent elements having a defined orientation. For example, a layout for a packaging material may include a plurality of textual elements and a plurality of graphical elements. Moreover, the layout defines the orientation of the elements in relation to each other within a two dimensional space that defines the packaging material to be printed. The artwork creation process may be similar to existing artwork creation software methods and system. An example of a system is Adobe Illustrator, possibly enriched with Esko software such as "Dynamic Content" or "Desk-Pack". Prior art artwork creation software focuses on the creation of the artwork and packaging design; the present system extends the artwork creation process to what will be coded on the final package.

Figure 2:
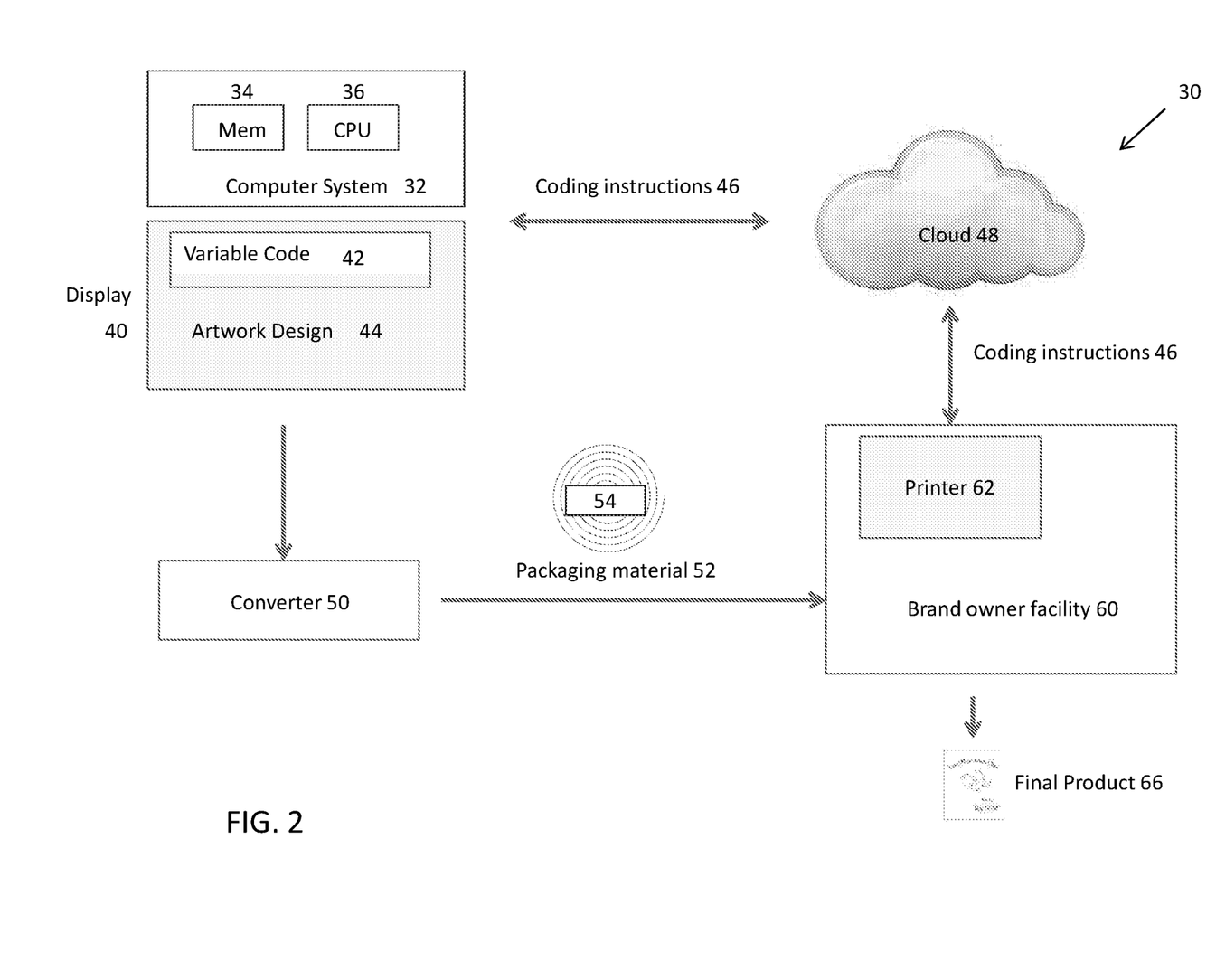
FIG. 2 depicts system components, including a computer system that can carry out one or more method embodiments of the present application.

The method is implemented on a processing system, e.g., a computer system. FIG. 2 depicts system 30 components, including a computer system 32 that can be used to carry out one or more method embodiments of the present invention, e.g., the method of the flow chart of FIG. 1, and a display 40 for a user to view. Computer system 32 has a CPU 36 and a memory 34 that typically includes persistent and non-persistent memory. Stored or loadable into memory 34 are software instructions of a software program that when executed by CPU 36 will cause a method embodiment of the present invention to be carried out. In some systems, the complete set of programming instructions of the program that when executed implements the method may be stored on a storage medium, such as optical or magnetic storage, to be read into computer system 32. Those skilled in the art will recognize the storage media may in fact be part of the computer system, or may be physically remote from computer system 32, and may, if desired, be accessed over a communications link such as the Internet, a network, etc.

As CPU 36 executes instructions of the program, the graphics artist can create and then lay out the various original graphic elements on display 40, e.g., images and/or text. As will be described in more detail below, the display 40 includes an artwork design 44 as well as a variable code 42 associated with the artwork design. Commercially available graphic design software is known in the art, and may be used as part of program. Exemplary commercially available software includes Studio, ArtiosCAD, ArtPro, and PackEdge, manufactured by Esko-Graphics located in Gent, Belgium. In particular, the graphic designers typically use graphic design software programs to produce the graphic artwork that is to be printed on the packaging material via manufacturing facilities. These graphic tools also allow the graphic artwork to be previewed (on the screen or on a hardcopy proof) so that it can be reviewed by various stakeholders before it is actually produced. Examples of other common graphic design software programs include QuarkXPress™, Adobe Photoshop™, Adobe Illustrator, Adobe PageMaker, Adobe Framemaker, In-Design™, and the like. The graphic designer typically delivers the artwork in the form of one or more graphic files.

The data description of the graphic file and the coding instructions may conform to a data description language, such as PDF or eXtensible Markup Language (XML). The data description may be stored within a centralized database, and provides for the elements of the graphic file to be individually retrieved and reused across different packaging materials.

In addition to the artwork design 44, the package includes a variable code 42 to be printed. Such variable codes are commonly used in the industry and include such codes as a lot code, batch code, time code, date code, use-by date, sell-by date, packaged date, born-on date, display-until date, or the like. The code may be alphanumeric, bar code, or other symbolic code. The variable date (such as the use-by date) could be programmed during the design process, and/or or modified later during the code printing step. The brand owner typically provides certain design constraints for the artwork and the variable code (how much space is needed/available and the like) and the artwork creator designs the artwork within these constraints The coding instructions 46 can include a variety of information for printing the code on the package. The coding instruction can include information about the location on the package for printing the code, including tolerances; information about the code format, including font, number of lines, and content of the code; information about the maximum line speed; information about the type of ink to be printed on the package, including ink color; the product verification specification; information on how the "best by" or "use by" day is determined; information on the filling equipment; and the like. The coding instructions may specify that some of the information may not be edited or changed, while other information may be modifiable by the operator of the production line. Thus, the print instructions may include specifications as to what fields or properties what can be modified by what type of entity, as in a content management system. For example, the coding instructions may allow the line operator to change the ink type or other fields, at the later printing step.

The system may include an expert system built into design software. The expert system would provide information to the designer as to where features should be built into package based on what will work on production line. For example, the system may provide templates suggesting certain locations, sizes, and/or formats for the printed variable code, or other suggestions to aid the artwork designer. The data for the expert system may be built in or may be modified over time based on particular users' collective experience. For example, an ink and/or printer manufacturer can compile data on the appearance of various inks on various types of substrates and incorporate this data into the expert system. If structural data (such as 3D shape) is available, an expert system can also assess the reachability (e.g. if printer throw distance is feasible) for the coding printer. The expert system can also assess the readability of the printed code by the consumer. Based on the ink type and background color, the system may also predict the contrast and readability of the code. As further seen in FIG. 2, after the coding instructions 46 are finalized, they are transferred to a remote storage location, such as a cloud based storage facility 48. A party such a converter 50 creates packaging materials 52 which depict the artwork. The brandowner or other party may also create the packaging materials. The packaging materials 52 are provided with an identifier such as a label 54 that is associated with the coding instructions 46. The packaging materials 52 are provided to the production or brand owner facility 60, which includes a printer 62. The coding instructions 46 are retrieved by the printer 62 and used to print a code on a package formed from the packaging materials, to form the final product 66. The process of retrieving the coding instructions 46 may be governed and protected by an appropriate permission structure, as is known in the art, to prevent unauthorized entities from retrieving coding instructions, or preventing the wrong entity from retrieving the wrong instructions. Such permission structures may include user names and/or passwords, biometrics, smartchips, and/or dongles and the like. The various data transfer steps disclosed herein may be protected by encryption processes and the like.

Now going into more detail on individual steps of the process, an example of a display 40 for the computer system 32 is shown in FIG. 3A. The display may include tools or menus 41, 43 to allow a user to create and modify the various elements. The artwork 44 may include both text 45 and images 47. A menu 49 for coding instructions 46 is provided on the display 40. In the embodiment shown in FIG. 3A, it can be seen that the coding instructions 46 include one line of code, a particular code format, ink type, and tolerance, a maximum line speed of 400 ft/s, and the use of a CIJ printer. Placeholder information for the content of the code may be presented and displayed. For example, the actual "best by" date to be printed will likely not be known during the artwork creation process (as it will vary based on the particular date that the coding printer prints the code), so placeholder information is used. It can be seen that the printed variable code displayed to the user corresponds to the desired code type and printer type (e.g. the character in the date code made of individual visible dots characteristics of a continuous inkjet printed code). In one embodiment, the system allows a user to preview the artwork design with the printed code during the artwork creating process, as shown in FIG. 3B. In FIG. 3B, it can be seen that the variable code is desired to be printed with a TTO printer, which has a code with finer details or more resolution, compared to the CIJ printed code.

Thus, the system may allow a user or designer to preview/predict the appearance of the code (such as bar code) by technology in design stage. For example, a designer may wish to see how the choice of different printing technologies (such as continuous inkjet (CIJ) printing, thermal transfer overprinting, or laser marking) affects the appearance of the code printed on a package. For example, CIJ printing provides a code with characters composed of individual droplets, while laser marking can provide characters composed of lines or vectors. The code preview may also include the appearance of the code by ink type and/or substrate composition. For printed bar codes, the system may provide readability by grade and different lighting conditions.

The coding instructions are associated or linked with the artwork design. This association or linkage may be accomplished in any suitable way. In one embodiment, the coding instructions are provided in a PDF including information about the artwork design. For example, they may be in particular user fields within the PDF, in comments or other additional data sources within the PDF, or in metadata or other data sources within the PDF or associated with the PDF. In the beginning of the artwork creation and approval process, the coding instructions may travel with the PDF. The coding instructions may be part of the "job description language." Thus, the information included in the coding instructions can be viewed, approved, moved, interact with the other elements of the artwork design.

After the artwork design and coding instructions are completed, the coding instructions are transmitted to a remote storage location. By 'remote' is meant remote from the printer where the coding instructions will be implemented. The remote storage location may be "cloud-based" as it is conventionally known, for example a server accessible by both the system on which the artwork is created and the system that prints the labels. The remote storage location may also be any conventional computer information storage system. The coding instructions may be transferred by any suitable method, including email, FTP, HTTP, and the like. The instructions may be in JDF (job description format).

The artwork design is transmitted to the entity who will print the artwork onto the package or packaging material. This entity may be the brand owner itself, or a third party such as a converter. Thus, the artwork design may be transferred to a converter for printing the artwork on the package or a component thereof. The artwork may be printed on the packaging material by any suitable method, for example, offset printing, gravure printing, flexographic printing, digital printing, and the like. It will generally be a different type of printing method than that used to print the variable code on the package. The packaging material may be, for example, a roll of plastic film or foil that will be formed into a bag, or cardboard that will be formed into a box or other container.

After the coding instructions are published to the cloud or other remote storage location, the substrate including the package materials is provided at the production line where the code is to be printed. A unique identifier is provided with the package, package materials that the package is formed from, or a component thereof to allow a user (typically the printer operator) to retrieve the coding instructions for printing the code on the package. The unique identifier may be provided as a bar code, a QR code, an alphanumeric character string, an RFID chip, or the like. For example, a roll of packaging materials that is used to ultimately create the package may be provided with a label with a bar code, alphanumeric code, or RFID chip that container the unique identifier associated with the printing instructions. The identifier may also be provided as part of the artwork itself, such as a scannable bar code as part of the package design. The label containing the unique identifier may be produced at the same time that the packaging materials are produced and from the same information provided with the artwork file. The artwork might already have a unique identifier, such as a SKU number or the bar-code. This can be re-purposed to associate the coding instructions with that package. Multiple options for providing the unique identifier may be provided.

The identifier is used to retrieve the coding instructions from the remote storage location and provide them to a printer for printing the code on the package. The coding instructions can be retrieved by any suitable method. In one embodiment, the coding instructions are retrieved from the remote storage location by scanning a bar code associated with the package, package materials, or a component thereof with a bar code scanner. In another embodiment, the coding instructions are retrieved from the remote storage location by a user entering a code from a printed indicia associated with the package, package materials, or a component thereof into a printing device. In another embodiment, the coding instructions are retrieved from the remote storage location by the printer or a component in communication with the printer retrieving the unique identifier from an RFID tag. Once the unique identifier is entered into the printer or a controller associated with the printer, the coding instructions in the code file are retrieved from the remote storage location and loaded onto the printer. This transfer may be by any suitable method, e.g. Ethernet, wireless connection, FTP, HTTP, or the like. This transfer of instructions to the printer could occur manually (e.g. via a storage chip, card, or disk) if the printer does not have access to the internet. The process of transferring the coding instructions 46 may be governed and protected by an appropriate permission structure, as is known in the art, to prevent unauthorized entities from retrieving coding instructions, or preventing the wrong entity from retrieving the wrong instructions. The data transfer steps may be protected by appropriate encryption processes. The coding instructions may be provided with a digital or printed thumbnail image of how the printed artwork with the variable code should look, from the approved image.

The printer may be any type of printer for printing variable information on a substrate. Non-limiting examples include continuous inkjet printers, thermal transfer overprinters, thermal inkjet printers, drop-on-demand printers, laser coders, piezoelectric printers, binary array printers, and the like. Suitable printers are available from Videojet Technologies, Inc., and include the Videojet® 1000 series continuous inkjet printers, Videojet® 8610 thermal inkjet printers, Videojet® Dataflex thermal transfer printers, Videojet® 2300 series case coding printers, Videojet® 3000 series $CO_2$ lasers, Videojet® 9550 print and apply labeler, and other coding printers. The present system can also be used with any labeling device or system and can be used to print labels or other media, or can be used to print directly on packaging material such as folding cartons, boxes, flexible films or the like.

In one embodiment, some of the content of the coding instructions are received from the remote storage location, while other portions are inputted by the system operator.

Figure 4:
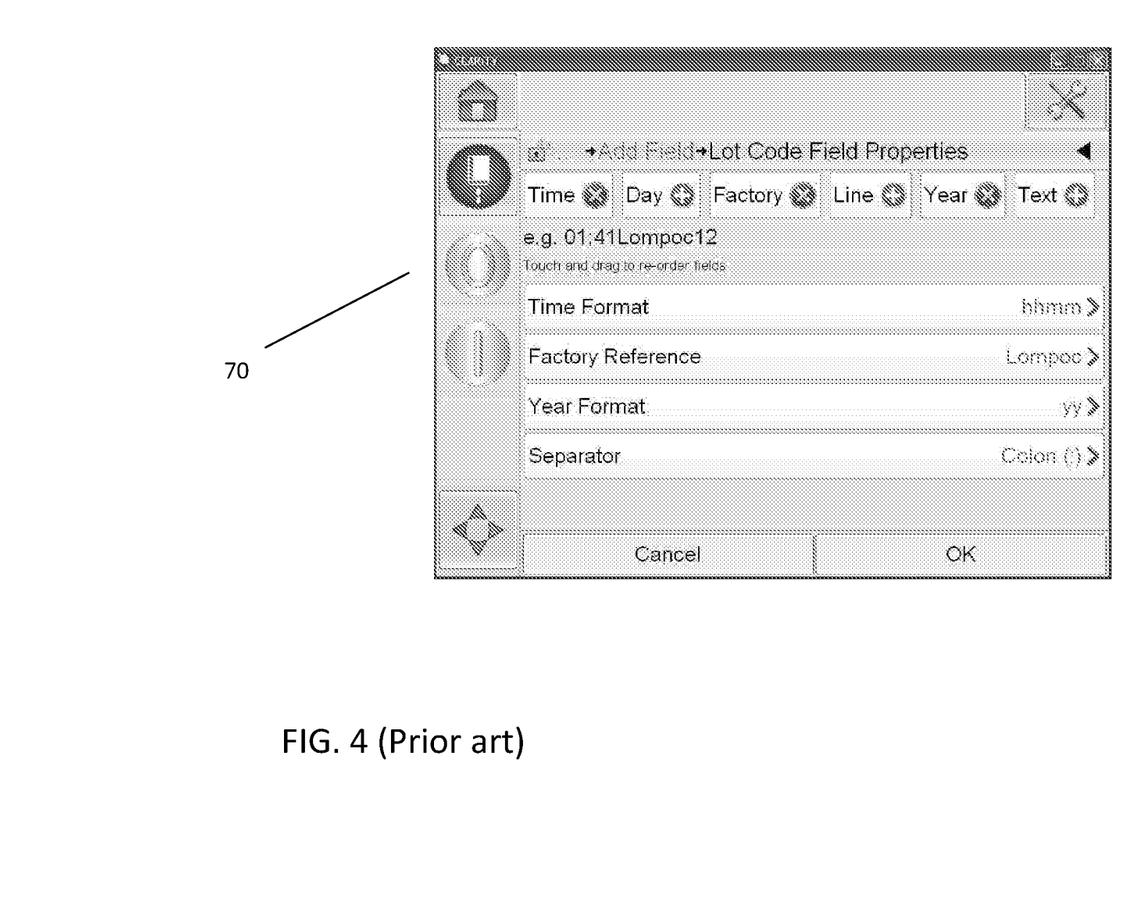
FIG. 4 shows a prior art embodiment of a user interface for a printer.
Figure 5:
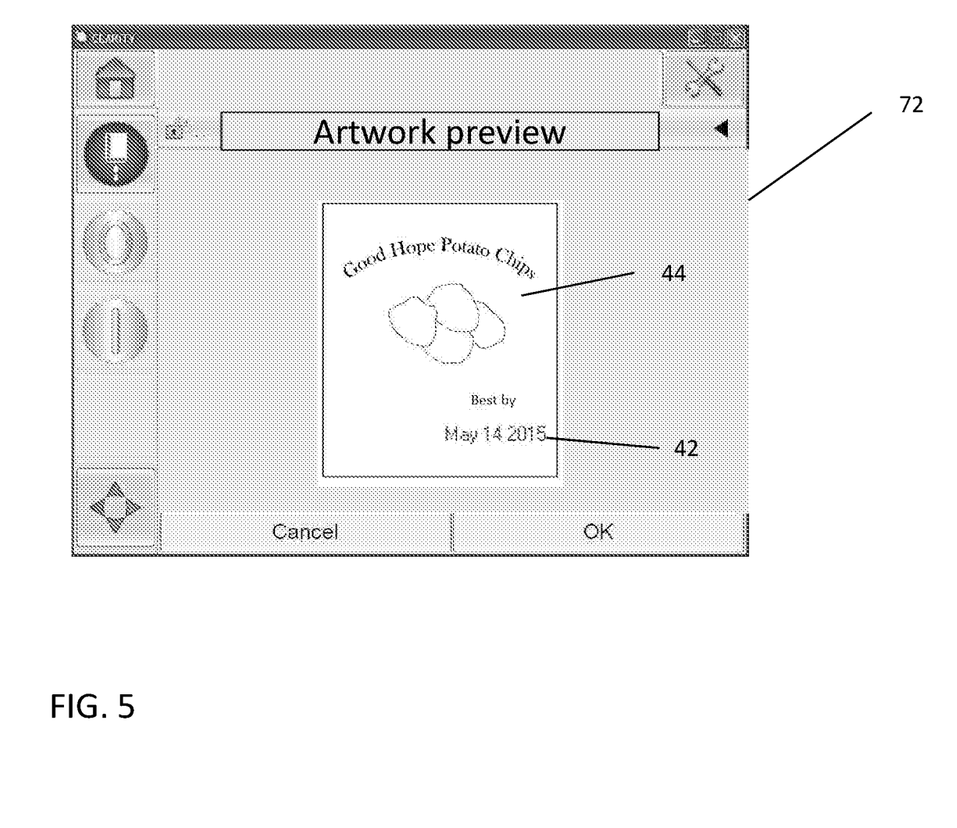
FIG. 5 shows the user interface of FIG. 4 with displaying a preview of the artwork and the printed variable code.

In one embodiment, the screen or other user interface of the printer that prints the variable code may display not only the code to be printed, but also how the code looks on/with the artwork, or on the package as a whole. For example, the coding can also be outside the printable area of the artwork design or the substrate that the artwork is printed on. Also in these cases, the design software can be used to design, visualize, and approve the coding. FIG. 4 shows a conventional user interface 70 for a variable code printer such as a continuous inkjet printer. Such a system is available as the Clarity™ interface available from Videojet Technologies Inc. and one embodiment of such a system is disclosed in prior PCT application WO2014047031A2, assigned to Videojet Technologies Inc., the contents of which are hereby incorporated by reference. Such systems 70 contain various features for creating and editing the variable code. As shown in FIG. 5, the same system on the local printer may also include a preview of the artwork 44 and variable code 42 to be printed on the packaging material. This allows the user a final check to make sure the code looks correct and also can serve as a quality check to ensure that the final printed product matches what was intended at the artwork design stage. For features of the coding instructions that may be changed by the user at the printing stage, the system may allow these changes to be reported back to the brand owner or artwork creator.

Thus, the system disclosed herein provides that the format of the printed variable codes can be provided during the artwork creating and approval process and thus be controlled by the artwork designers and/or brand owners. This can lead to consistent printed codes across lines and plants, so that the same code with the same appearance is printed in the same location on the package, regardless of where it was created. Further, the factories or plants where the variable codes are printed have the most up-to-date information about the packaging design. The coding instructions travel with the package materials themselves, rather than be left to some other system or to the expertise of the person in charge of the line in the plant. The disclosed system is automatic and requires little manual effort to ensure that the right product has right code and the right setup.

It is understood by one of skill in the art that embodiments of the present invention relate not just to methods for carrying out the aforementioned steps, such as with a computer or other processor, but also to systems for executing the methods, including such printers or processors. For example, the method may be performed by a processor programmed with instructions corresponding to the method steps described herein. Embodiments of the invention also include computer readable media including program instructions, which when executed by a processor, cause the processor to perform the method steps, as well as processors so programmed. Additional embodiments comprise systems that include such programmed processors and output devices connected thereto for receiving the output files and creating an output corresponding to that file.

It should be understood that the method described above may be performed by a computer or computer system comprising data storage, such as a computer memory, with a plurality of memory locations and a processor configured to perform the various steps described herein. The computer system may be a special purpose computer system for creating and storing documents for printing, or a general purpose computer system programmed with instructions for carrying out the methods described herein. The computer system may comprise one or more output devices. For example, the computer system may have a first output device in the form of a display screen for viewing the document, and a second output device in the form of a printer or a commercial printing press for printing the document. Thus, the source document may have a first color space corresponding to the display, and the destination document may be color converted for printing on the printing press, in which the color space is defined by the printing inks available on that press, as is well known in the art. More commonly, a PDF may be prepared for one type of output press (e.g. an offset press) that is different than the one actually used for printing (e.g. a digital press). For example, a PDF may be prepared for a CMYK device, when the actual press used may use redundant colors or spot colors or may otherwise have an expanded gamut available, thus requiring color space conversion before printing. The computer system may further comprise a raster image processor (RIP) for preparing the destination document for output on the output device. It should be understood that the display for which the source document is configured, however, may not be a part of the computer system for creating the destination document, outputting the document on the output device, or RIPping the document prior to output. For example, the source document may be formatted for a color space corresponding to the creator of the document, such as a graphics design agency, and the destination document may need to be formatted for display and printing associated with a commercial printing facility.

It should also be understood that the instructions for programming a general purpose computer system to carry out the method steps, may comprise a computer program product embodied on any type of non-transitory computer-readable medium known in the art, such as but not limited to flash drives, hard drives, optical disks such as DVDs, and the like. Computer memory embodying such instructions may be accessible over a computer network for enabling copies of the computer program product to be downloaded from a first memory residing in one location to a second memory residing in a second location. The computer system may include one or more elements connected over a global computer network, such as the Internet, in which one or more memories or processors described herein are centralized and accessible remotely, or in which the instructions are downloaded only temporarily on a local computer system for carrying out the claimed methods. The invention is not limited to any type of computer, computer system, computer memory, or computer-readable medium. It should be further understood that the term computer may refer to multiple computers linked together, just as "computer system" may refer to a single computer having all of the claimed components or functions. Where multiple computer memory locations are referenced, it should be understood that such memory locations may comprise discrete portions of a single memory device, or may comprise separate memory devices, and that such memory locations may be adjacent to one another in a single geographic location, or distributed over locations that are separated from one another in distances measurable in microns or miles. Similarly, the term "processor" should be understood to refer to a single or multiple processors configured to carry out the method steps. Finally, although referred in connection with certain document file types (PDF and PDF/VT) and a specific manner of storing recurring content (XObject), it should be understood that the invention is not limited to any particular file type or storage algorithm, although it is ideal for use in connection with consolidated documents or page definition language (PDL) documents.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

What is claimed is:

1. A method comprising:

providing, by a processor of a computing system, a code creating instruction (CCI) tool for creating coding instructions for printing a code by a printer device on a package or package material subsequent to an artwork design being applied to the package or package material, the package or packaging material with the artwork design provided with an identifier associated with the coding instructions and the CCI tool including a coding instruction menu having at least one editable printer setting;

causing, by the processor, a display device to display the artwork design, the coding instruction menu, the at least one editable printer setting of the menu, and a representation of the code to be printed on the package or packaging material with the artwork design and according to the coding instructions;

transferring, by the computing system, the coding instructions to a remote memory device, the coding instructions for printing the code linked to the artwork; and accessing, by the printer device and in communication with the remote memory device, the coding instructions from the remote memory device, in response to retrieving the identifier of the artwork design on the package or the package material, wherein the printer device prints the code on the package or the package material in accordance with the coding instructions.

2. The method of claim 1, further comprising: re-purposing a bar code or SKU code of the artwork as the identifier to electronically access the coding instructions from the remote memory device; and providing the coding instructions to the printer device for printing the code on the package or the package material.

3. The method of claim 1, wherein the coding instructions further comprise information about a location on the package or the package material for printing the code.

4. The method of claim 1, wherein the coding instructions further comprise information about a format of the code and further comprising editing the coding instructions via the displayed coding instruction menu by editing the format of the code.

5. The method of claim 1, wherein the coding instructions further comprise information about a maximum line speed printer setting at which the code should be printed and further comprising editing the coding instruction, via the displayed coding instruction menu, by editing the maximum line speed printer setting.

6. The method of claim 1, wherein the coding instructions further comprise information about a type of ink to print the code on the package or the package material and further comprising the editing the coding instructions, via the displayed coding instruction menu, by editing the type of ink to print the code by the printer device.

7. The method of claim 1, wherein the code comprises a variable code selected from a lot code, batch code, time code, date code, date, or combination thereof and further comprising previewing, via the displayed CCI tool, the artwork design with the characteristic representation of the variable code printed on the artwork.

8. The method of claim 1, wherein the artwork design comprises graphical components and text components and further comprising:
creating the artwork design;
printing the artwork design on the package or the package material; and
causing the printer device to print the code in accordance with the coding instructions on the package or the package material.

9. The method of claim 8, further comprising previewing the artwork with the representation of the code during the creating of the artwork for the package.

10. The method of claim 1, wherein the coding instructions are provided in a PDF file comprising information about the artwork design.

11. The method of claim 1, further comprising transferring the artwork design to a converter for printing the artwork design on the package or the package material.

12. The method of claim 11, wherein the identifier comprises a bar code associated with the artwork design printed on the package or the package material; and further comprising:
scanning the bar code on the package or the package material to retrieve the identifier wherein the accessing of the coding instructions being based on the scanned bar code.

13. The method of claim 1, wherein the identifier comprising a printed indicia associated with the artwork design printed on the package or the package material and further comprising:
receiving, by a printer device, a user entered code from the printed indicia wherein the accessing of the coding instructions being based on the user entered code.

14. A system for providing coding instructions comprising:
a code creating instruction (CCI) tool for creating coding instructions for printing a code by a printer device on a package or package material subsequent to an artwork design being applied on the package or the package material, and the package or packaging material with the artwork design provided with an identifier associated with the coding instructions and the CCI tool including a coding instruction menu having at least one editable printer setting;
a remote memory device;
a computing system with a processor and a display device, the processor configured to:
cause the display device to display the artwork design for the packaging or packaging together with the coding instruction menu, the at least one editable printer setting, and a representation of the code to be printed according to the coding instructions, and
transfer the coding instructions to the remote memory device, the coding instructions for printing the code linked to the artwork design; and
a production line printer device configured to communicate with the remote memory device and access the coding instructions from the remote memory device, in response to retrieving the identifier of the package or the package material with the artwork design, wherein the printer device prints the code on the package or the package material in accordance with the coding instructions.

15. The system of claim 14, wherein the coding instructions further comprise information about a location on the package for printing the code.

16. The system of claim 14, wherein the coding instructions further comprise information about a format of the code and the processor further configured to edit the coding instructions via the displayed coding instruction menu by editing the format of the code.

17. The system of claim 14, wherein the coding instructions further comprise information about a maximum line speed printer setting at which the code should be printed and the processor further configured to edit the coding instruction, via the displayed coding instruction menu, by editing the maximum line speed printer setting.

18. The system of claim 14, wherein the coding instructions comprise information about a type of ink to print the code on the package or the package material and further comprising the editing the coding instructions, via the displayed coding instruction menu, by editing the type of ink to print the code by the printer device.

19. The system of claim 14, wherein the code comprises a variable code selected from a lot code, batch code, time code, date code, date, or combination thereof and further comprising previewing, via the displayed CCI tool, the artwork design with the representation of the variable code printed on the artwork.

20. The system of claim 14, wherein the artwork design comprises graphical components and text components.

21. The system of claim 14, wherein the processor is configured to display via the CCI tool a preview of the artwork design with the representation of the code during an artwork creating process.

22. The system of claim 14, wherein the coding instructions are provided in a PDF document comprising information about the artwork design.

* * * * *